US009858226B2

(12) United States Patent
Iyer et al.

(10) Patent No.: US 9,858,226 B2
(45) Date of Patent: Jan. 2, 2018

(54) TWO WIRE SERIAL VOLTAGE IDENTIFICATION PROTOCOL

(71) Applicants: Jayesh Iyer, Bangalore (IN); Edward R. Stanford, DuPont, WA (US); Waseem Kraipak, Bangalore (IN)

(72) Inventors: Jayesh Iyer, Bangalore (IN); Edward R. Stanford, DuPont, WA (US); Waseem Kraipak, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 14/126,135

(22) PCT Filed: Dec. 28, 2012

(86) PCT No.: PCT/US2012/071993
§ 371 (c)(1),
(2) Date: Dec. 13, 2013

(87) PCT Pub. No.: WO2013/106206
PCT Pub. Date: Jul. 18, 2013

(65) Prior Publication Data
US 2014/0317330 A1 Oct. 23, 2014

(30) Foreign Application Priority Data

Jan. 13, 2012 (IN) .............................. 124/DEL/2012

(51) Int. Cl.
G06F 13/42 (2006.01)
G06F 13/40 (2006.01)
(Continued)

(52) U.S. Cl.
CPC .............. *G06F 13/40* (2013.01); *G06F 1/266* (2013.01); *G06F 1/3287* (2013.01); *G06F 13/4295* (2013.01); *G06F 13/4291* (2013.01); *G06F 2213/0052* (2013.01); *Y02B 60/1282* (2013.01)

(58) Field of Classification Search
CPC .... G06F 1/26; G06F 13/4291; G06F 13/4295; G06F 1/266; G06F 1/3287; G06F 2213/0052; Y02B 60/1282; Y02B 60/31
See application file for complete search history.

(56) References Cited

U.S. PATENT DOCUMENTS 6,067,585 A 5/2000 Hoang
6,532,506 B1 3/2003 Dunstan et al.
(Continued)

FOREIGN PATENT DOCUMENTS

WO 00/073870 A1 12/2000
WO 2013/106206 A1 7/2013

OTHER PUBLICATIONS

Extended European Search Report received for European Patent Application No. 12864702.1, dated Oct. 12, 2015, 5 pages.
(Continued)

Primary Examiner — Ernest Unelus
(74) Attorney, Agent, or Firm — Alpine Technology Law Group LLC

(57) ABSTRACT

In one embodiment a system comprises an integrated circuit, a plurality of voltage regulators; and a data bus coupled to the integrated circuit and the plurality of voltage regulators. In some embodiments the integrated circuit comprises logic to embed a timing signal on the data bus. Other embodiments may be described.

14 Claims, 5 Drawing Sheets

(51) Int. Cl.
G06F 1/26 (2006.01)
G06F 1/32 (2006.01)

(56) References Cited

U.S. PATENT DOCUMENTS

| | | |
|---|---|---|
| 6,539,443 B1 | 3/2003 | Dunstan et al. |
| 6,735,633 B1 | 5/2004 | Welch et al. |
| 7,143,215 B2 | 11/2006 | Dunstan et al. |
| 8,412,976 B2 | 4/2013 | Kraipak et al. |
| 8,417,986 B2 | 4/2013 | Kraipak et al. |
| 2004/0049616 A1* | 3/2004 | Dunstan .............. G06F 13/4295 710/100 |
| 2004/0093533 A1 | 5/2004 | Chapuis et al. |
| 2006/0002161 A1* | 1/2006 | Dangelo ............ G01R 31/2863 363/147 |
| 2008/0154400 A1 | 6/2008 | Wang |
| 2009/0322304 A1 | 12/2009 | Oraw et al. |
| 2011/0154075 A1 | 6/2011 | Kraipak et al. |
| 2011/0226462 A1 | 9/2011 | Sato et al. |

OTHER PUBLICATIONS

International Preliminary Report on Patentability and Written Opinion received for PCT Patent Application No. PCT/US2012/071993, dated Jul. 24, 2014, 7 pages.
International Search Report and Written Opinion received for PCT Patent Application No. PCT/US2012/071993, dated Apr. 30, 2013, 12 Pages.

* cited by examiner

TWO WIRE SERIAL VOLTAGE IDENTIFICATION PROTOCOL

RELATED APPLICATIONS

This application is related to commonly assigned and copending U.S. patent application Ser. No. 12/912,924 to Kraipak, et al, entitled Data Negotiation Using Serial Voltage Identification Communication, which published as U.S. Patent Application Publication No. 2011/015075. This application is related to commonly assigned and copending U.S. patent application Ser. No. 12/912,952 to Kraipak, et al, entitled Time Negotiation Using Serial Voltage identification Communication, which published as U.S. Patent Application Publication No. 2011/015076. The respective disclosures of these applications are incorporated herein by reference in their respective entireties.

BACKGROUND

The subject matter described herein relates generally to the field of electronic devices and more particularly to a system and method to implement a two wire serial voltage identification protocol in electronic devices.

Electronic devices such as computer systems may include onboard systems that consume significant amounts of power. In some situations, a user may be using the computer system for tasks that do not require the use of each onboard system or that do not require each onboard system to function at full power. In this situation, the computer system may want to reduce power to specific onboard systems by sending a signal from a processor to a voltage regulator associated with the specific onboard systems.

In conventional computer systems, each voltage regulator must be configured to communicate with the processor at a set frequency that is pre-determined by the processor. For example, it the processor is configured to communicate at a frequency of 25 MHz, then each voltage regulator must communicate at 25 MHz. If a voltage regulator is not capable of communicating at the processor's pre-determined frequency, then the voltage regulator will not be able to communicate with the onboard processor.

Accordingly systems and techniques to manage communication between a processor and one or more voltage regulators may find utility.

BRIEF DESCRIPTION OF THE DRAWINGS

The detailed description is described with reference to the accompanying figures.

DETAILED DESCRIPTION

Described herein are exemplary systems and methods to implement transaction integrity in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
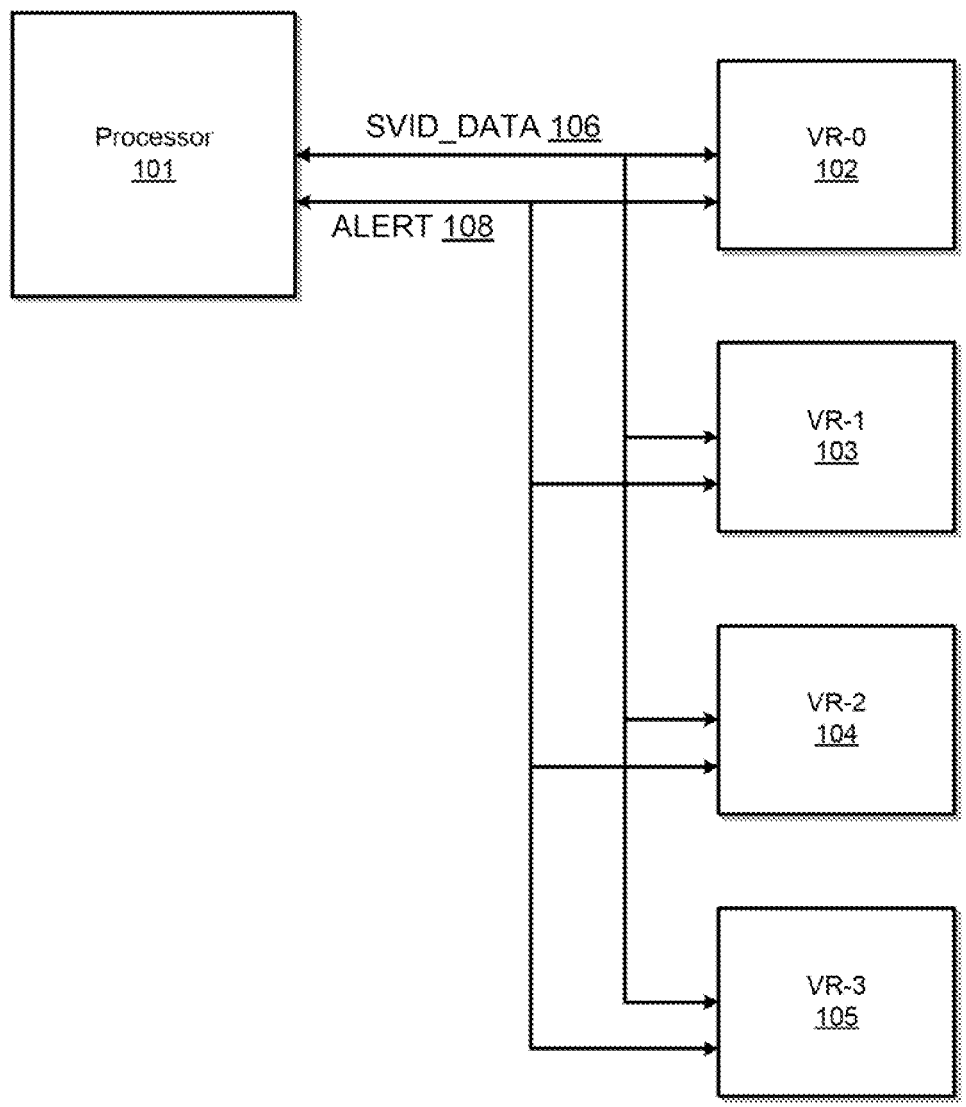
FIG. 1 is a schematic illustration of an exemplary electronic system may be adapted to include a two-wire serial voltage identification protocol in accordance with some embodiments.

FIG. 1 is a schematic illustration of an exemplary electronic system 100 which may be adapted to include a two-wire serial voltage identification protocol in accordance with some embodiments. Referring now to FIG. 1, system 100 may comprise a processor 101 (e.g., a central processing unit or an integrated circuit), a plurality of voltage regulators 102/103/104/105, an open drain serial voltage identification (SVID) data bus 106 and an open drain alert bus 108. In some embodiments, the voltage regulators 102/103/104/105 may comprise any slave device that is coupled to the SVID data bus 106 and the alert bus 108.

The processor 101 may be electrically coupled to each of the plurality of voltage regulators 102/103/104/105 via the SVID data bus 106 and the alert bus 108. The SVID data bus 106 may facilitate serial communication between the processor 101 and the plurality of voltage regulators 102/103/104/105. In some embodiments of FIG. 1, a first one of the plurality of voltage regulators 102/103/104/105 may communicate with the processor 101 at a different frequency than a second one of the plurality of voltage regulators 102/103/104/105. For example, the voltage regulator VR-0 102 may communicate with the processor 101 at 15 MHz, voltage regulator VR-1 103 may communicate with the processor 101 at 20 MHz, voltage regulator VR-2 104 may communicate with the processor 101 at 22 MHz, and voltage regulator VR-1 103 may communicate with the processor 101 at 25 MHz, while the CPU may communicate at 25 MHz.

In some embodiments the system 100 may implement a serial voltage identification protocol which enables clock signal to be embedded in the SVID_DATA bus 106. In operation, to establish communication, the CPU will drive the SVID line to a logic low voltage. As soon as the SVID line goes low, the voltage regulators will also start to drive the same SVID line low. All devices including the CPU will hold the SVID line low based on their respective data rate (i.e., each device stops driving the SVID line at a point in time determined by its individual data rate). Thus, the SVID line will be held low for the maximum time by the slowest device coupled to the SVID_DATA bus.

Figure 2A:
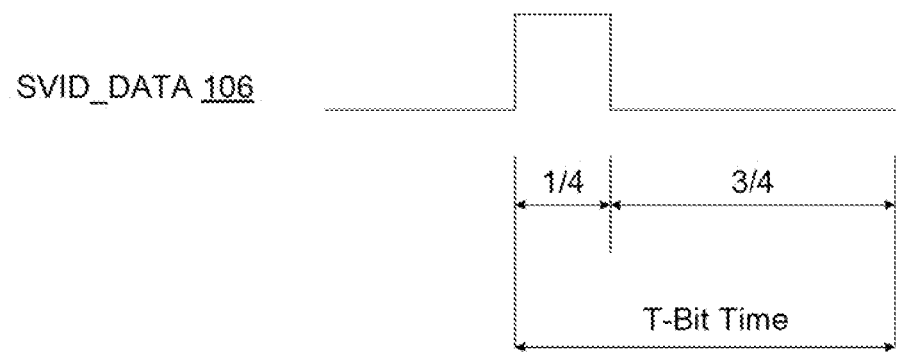
FIGS. 2A and 2B are timing diagrams which provide a schematic illustration of an exemplary technique to establish communication by driving a data bus, in accordance with some embodiments.
Figure 2B:
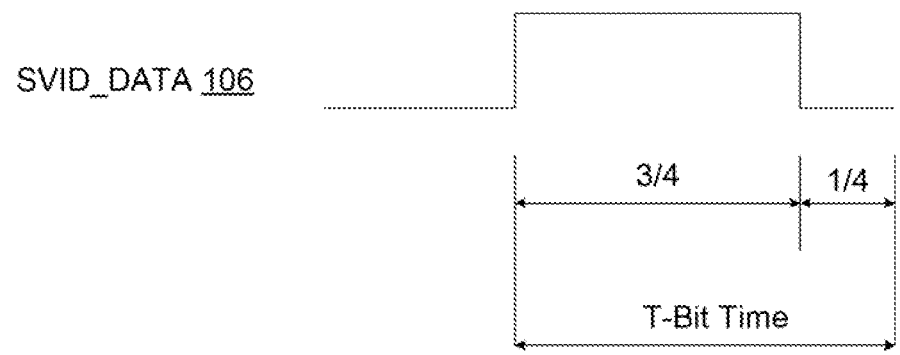

In some embodiments the system implements a protocol referred to herein as a "Return-to-Zero" format. FIGS. 2A and 2B are timing diagrams which provide a schematic illustration of an exemplary technique to drive logic low or logic high on a data bus, in accordance with some embodiments.

Referring to FIG. 2A, if the processor 101 wants to drive the SVID_DATA bus 106 to a logic low (i.e., "0") then the processor drives the SVID_DATA bus 106 to a logic high (i.e., "1") voltage for an amount of time corresponding to one-quarter (¼) of a bit time (i.e., a clock period) and then drives the SVID_DATA bus 106 to a logic low (i.e., "0") voltage for an amount of time corresponding to three-quarters (¾) of a bit time.

By contrast, referring to FIG. 21B, if the processor 101 wants to drive the SVID_DATA bus 106 to a logic high (i.e., "1") then the processor drives the SVID_DATA bus 106 to a logic high (i.e., "1") voltage for an amount of time corresponding to three-quarters (¾) of a bit time (i.e., a clock period) and then drives the SVID_DATA bus 106 to a logic low (i.e., "0") voltage for an amount of time corresponding to one-quarter (¼) of a bit time.

Figure 3:
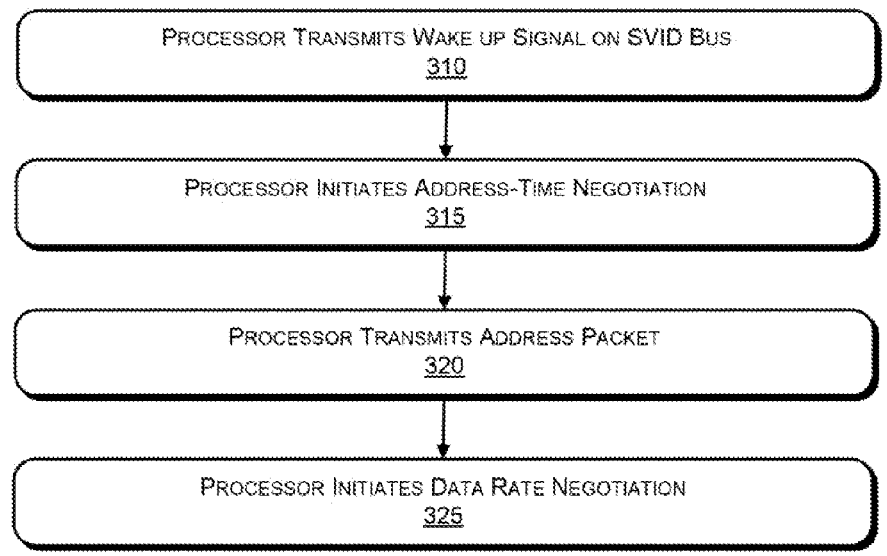
FIG. 3 is a flowchart illustrating operations in a method to implement a two-wire serial voltage identification protocol in accordance with some embodiments.

The pulse patterns depicted in FIGS. 2A and 2B allows the system 100 to communicate with the plurality of voltage regulators in the system without a formal clock bus. FIG. 3 is a flowchart illustrating operations in a method to implement a two-wire serial voltage identification protocol in accordance with some embodiments. Referring to FIG. 3, at operation 310 the processor 101 transmits a wake-up signal on the SVID_DATA bus 106. In some embodiments the wake up signal may correspond to the logic low signal depicted in FIG. 2A. When the respective voltage regulators 102-105 detect that the processor 106 is driving a logic low signal on the SVID_DATA bus 106, the respective voltage regulators 102-105 may wake up from to start communication or perform other functions.

At operation 315 the processor initiates an address-time negotiation process. One exemplary address-time negotiation process is described in commonly assigned and co-pending U.S. Patent Application 2011/0154076. To initiate the negotiation process the processor 106 again drives a logic "low" on the SVID_DATA bus 106, as described with reference to FIG. 2A.

Figure 4:
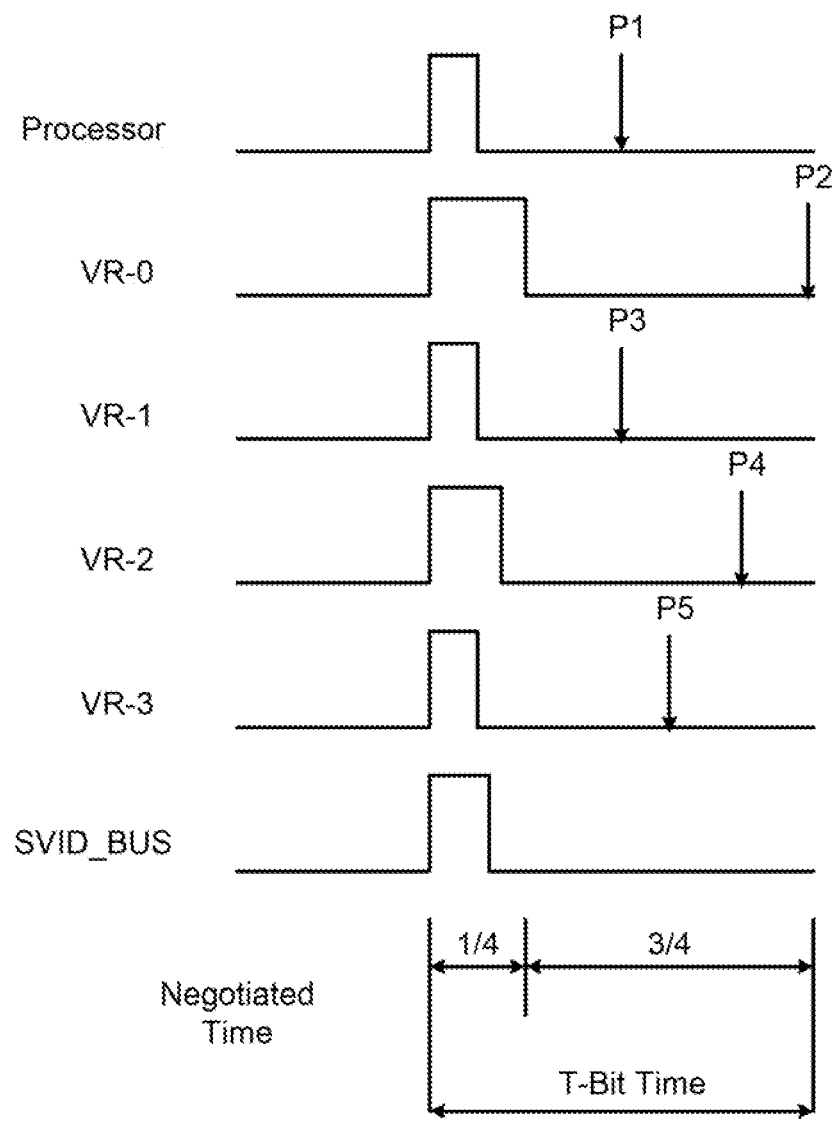
FIG. 4 is a timing diagram which provides a schematic illustration of an exemplary technique for address-time negotiation in accordance with some embodiments.

FIG. 4 is a timing diagram which provides a schematic illustration of an exemplary technique for address-time negotiation in accordance with embodiments in which the processor 106 and the voltage regulators operate at the data rates described above. Referring to FIG. 4, the processor 101 will drive logic on the SVID_DATA bus 106 for a time period corresponding to a point in time demarcated by P1. Voltage regulator VR-0 will drive logic on the SVID_DATA bus 106 for a time period corresponding to a point in time demarcated by P2, Voltage regulator VR-1 will drive logic on the SVID_DATA bus 106 for a time period corresponding to a point in time demarcated by P3. Voltage regulator VR-2 will drive logic on the SVID_DATA bus 106 for a time period corresponding to a point in time demarcated by P4. Voltage regulator VR-3 will drive logic on the SVID_DATA bus 106 for a time period corresponding to a point in time demarcated by P5. In the example depicted in FIG. 4 the voltage regulator VR-0 is the slowest device so it will drive logic on the SVID_DATA bus 106 for extra time as shown in the FIG. 4.

In operation, the devices coupled to the SVID_DATA bus 106 may monitor the SVID_DATA bus 106 after they have stopped driving for logic low. When each of the devices starts driving a logic low on the SVID_DATA bus 106, each respective device may start an internal time negotiation counter till the device detects a logic "low" on the bus. This time value on the internal time negotiation counter corresponds to the ¼th t-bit time for each respective device. This value will be shifted by 2-bits (multiplied by 4) to give the complete t-bit time (i.e., clock cycle time) for the device.

In the embodiment depicted in FIG. 4, the voltage regulator VR-0 has the slowest speed and the longest time period P2. Therefore the t-bit time calculated will be equal to the VR-0 t-bit time, and the processor 101 may communicate with the respective voltage regulators 102-105 at a data rate corresponding to the data rate of VR-0. This ensures that all the devices are able to negotiate in the Address Negotiation period Referring back to FIG. 3, at operation 320 the processor 101 transmits an Address Packet on the SVID_DATA bus 106. By way of example if the addressed device is VR-3 then each voltage regulator controller will receive the address, but only VR-3 will respond and participate in the rest of the communication.

Figure 5:
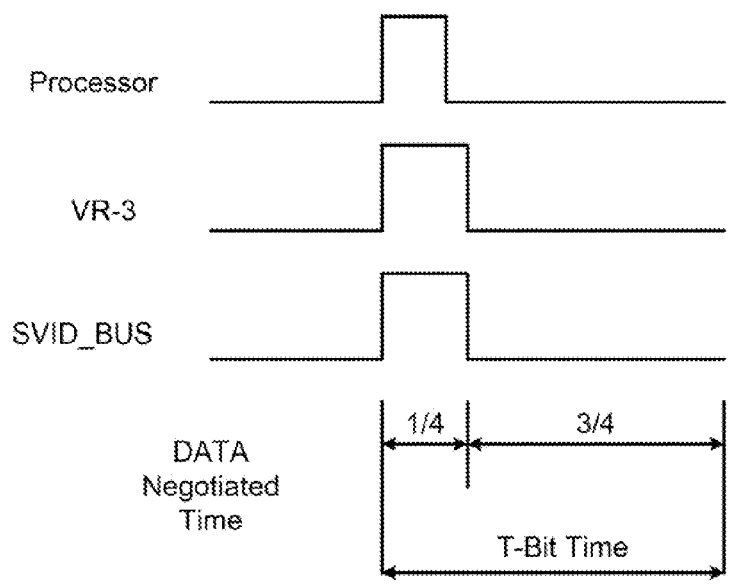
FIG. 5 is a timing diagram which provides a schematic illustration of an exemplary technique for data rate negotiation in accordance with some embodiments.
Figure 6:
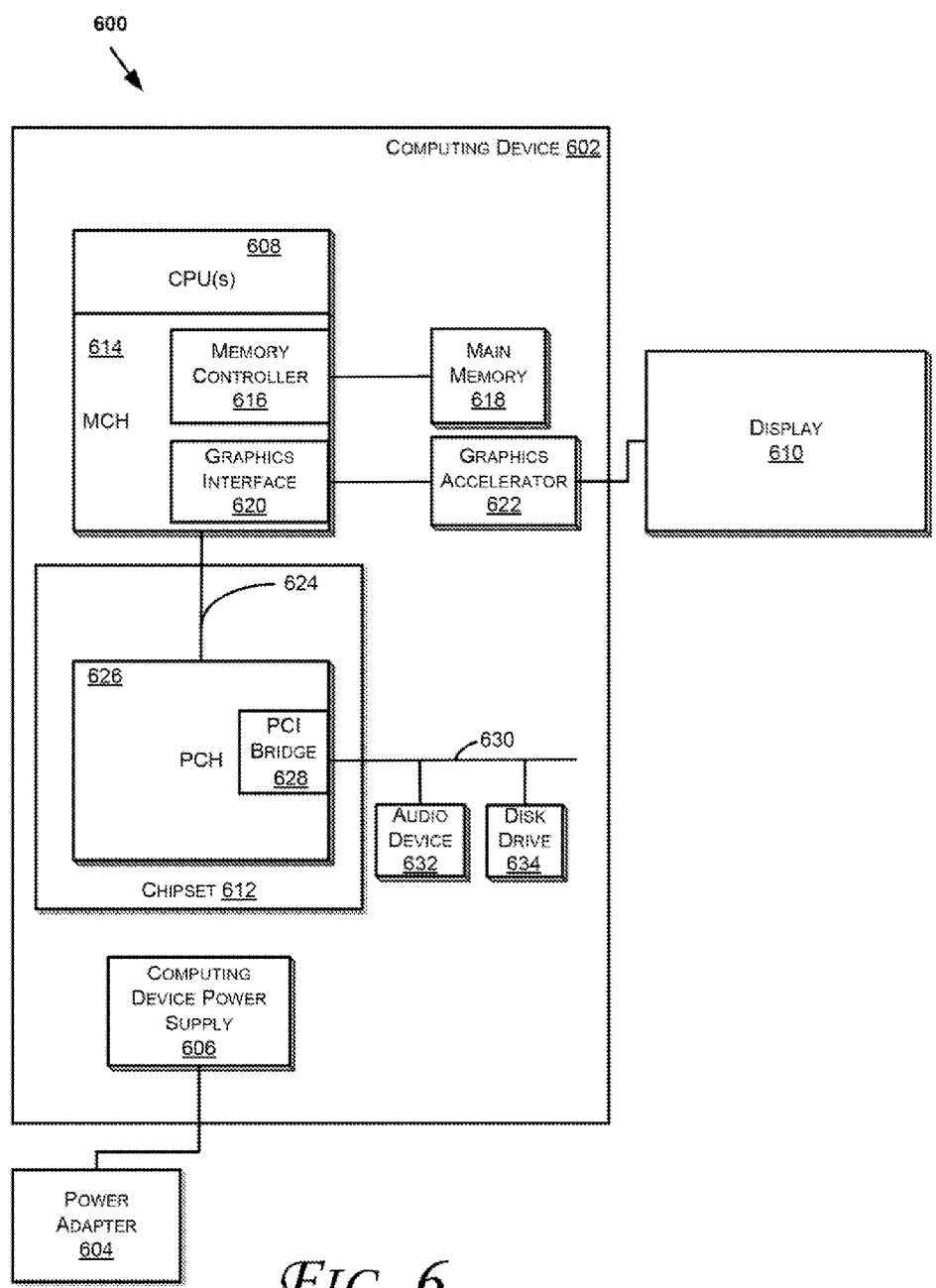
FIG. 6 is a schematic illustration of an electronic device which may be adapted to implement a two-wire serial voltage identification protocol in accordance with some embodiments.

At operation 325 the processor initiates a data rate negotiation process. FIG. 5 is a timing diagram which provides a schematic illustration of an exemplary technique for data rate negotiation in accordance with some embodiments. Referring to FIG. 5, to initiate the process, the processor drives logic low on SVID_DATA bus 106. At this point only VR-3 will drive Logic "low" on the bus (i.e., only VR3 participates in the data rate timing negotiation with processor 101). Therefore, the t-bit time will be established using the VR-3 t-bit time as shown in FIG. 5. The processor 101 and VR-3 may now communicate with each other at the new data rate for the rest of the communication In some embodiments a system 100 may be incorporated into an electronic device which may be embodied as a computer system. FIG. 6 is a schematic illustration of a computer system 600 in accordance with some embodiments. The computer system 600 includes a computing device 602 and a power adapter 604 (e.g., to supply electrical power to the computing device 602). The computing device 602 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 602 (e.g., through a computing device power supply 606) from one or more of the following sources: one or more battery packs, an alternating current (AC) outlet (e.g., through a transformer and/or adaptor such as a power adapter 604), automotive power supplies, airplane power supplies, and the like. In some embodiments, the power adapter 604 may transform the power supply source output (e.g., the AC outlet voltage of about 110 VAC to 240 VAC) to a direct current (DC) voltage ranging between about 7 VDC to 12.6 VDC. Accordingly, the power adapter 604 may be an AC/DC adapter.

The computing device 602 may also include one or more central processing unit(s) (CPUs) 608. In some embodiments, the CPU 608 may be one or more processors in the Pentium® filmily of processors including the Pentium® II processor family, Pentium® III processors. Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 612 may be coupled to, or integrated with, CPU 608. The chipset 612 may include a memory control hub (MCH) 614. The MCH 614 may include a memory controller 616 that is coupled to a main system memory 618. The main system memory 618 stores data and sequences of instructions that are executed by the CPU 608, or any other device included in the system 600. In some embodiments, the main system memory 618 includes random access memory (RAM); however, the main system memory 618 may be implemented using other memory types such as dynamic RAM (DRAM), synchronous DRAM (SDRAM), and the like. Additional devices may also be coupled to the bus 610, such as multiple CPUs and/or multiple system memories.

The MCH 614 may also include a graphics interface 620 coupled to a graphics accelerator 622. In some embodiments, the graphics interface 620 is coupled to the graphics accelerator 622 via an accelerated graphics port (AGP). In some embodiments, a display (such as a flat panel display) 640 may be coupled to the graphics interface 620 through, for example, a signal converter that translates a digital representation of an image stored in a storage device such as video memory or system memory into display signals that are interpreted and displayed by the display. The display 640 signals produced by the display device may pass through various control devices before being interpreted by and subsequently displayed on the display.

A hub interface 624 couples the MCH 614 to an platform control hub (PCH) 626. The PCH 626 provides an interface to input/output (I/O) devices coupled to the computer system 600. The PCH 626 may be coupled to a peripheral component interconnect (PCI) bus. Hence, the PCH 626 includes a PCI bridge 628 that provides an interface to a PCI bus 630. The PCI bridge 628 provides a data path between the CPU 608 and peripheral devices. Additionally, other types of I/O interconnect topologies may be utilized such as the PCI Express™ architecture, available through Intel® Corporation of Santa Clara, Calif.

The PCI bus 630 may be coupled to an audio device 632 and one or more disk drive(s) 634. Other devices may be coupled to the PCI bus 630 In addition, the CPU 608 and the MCH 614 may be combined to form a single chip. Furthermore, the graphics accelerator 622 may be included within the MCH 614 in other embodiments.

Additionally, other peripherals coupled to the PCH 626 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 602 may include volatile and/or nonvolatile memory.

Thus, there is described herein an architecture and associated methods to implement transaction integrity in electronic devices. In some embodiments the architecture uses hardware capabilities embedded in an electronic device platform to provide assurances to transaction-authorizing parties that a transaction is being made by an authorized individual. In the embodiments described herein authentication and persistence are based processing that occurs within a trusted environment, separate from the host operating system. The execution environment may be implemented in a trusted execution engine, which obtains and verifies user identity, then provides proof of identity verification, and may provide other elements required to satisfy transaction requirements. The result is a platform-issued token that represents fulfillment of these required elements to relying parties. In some embodiments the trusted execution engine may be implemented in a remote device, e.g., a dongle.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. A system, comprising: an integrated circuit;
a plurality of voltage regulators; and
a data bus coupled to the integrated circuit and the plurality of voltage regulators; wherein the integrated circuit comprises logic to embed a timing signal on the data bus; wherein the logic to embed a timing signal is to drive the data bus to a logic high for a period of time corresponding to one-fourth a clock cycle, then to a logic low for a period of time corresponding to three-fourths a clock cycle;

wherein the integrated circuit comprises logic to initiate an address-time negotiation with the plurality of voltage regulators over the data bus to determine a data rate communication speed at which the integrated circuit communicates with the plurality of voltage regulators by detecting a transition from the logic high on the data bus to the logic low on the data bus, determining a time period value during which the data bus remained at the logic high, and shifting the time period value by two bits: and wherein data rate communication speed is determined by a data rate of at least one of the plurality of voltage regulators.

2. The system of claim 1, wherein the integrated circuit further comprises logic to initiate a timing negotiation process with the plurality of voltage regulators, wherein the timing negotiation process is to determine a communication speed associated with one or more of the plurality of voltage regulators.

3. The system of claim 2, wherein the timing negotiation process is to select a communication speed which permits communication with a voltage regulator that has the slowest data rate.

4. The system of claim 1, comprising logic to initiate a data rate negotiation process with at least one of the voltage regulators.

5. An apparatus, comprising:
an integrated circuit comprising logic to embed a timing signal on a data bus that is to couple the integrated circuit to a plurality of voltage regulators;
wherein the logic to embed a timing signal is to drive the data bus to a logic high for a period of time corresponding to one-fourth a clock cycle, then to a logic low for a period of time corresponding to three-fourths a clock cycle; and
wherein the integrated circuit comprises logic to initiate an address-time negotiation with the plurality of voltage regulators over the data bus to determine a data rate communication speed at which the integrated circuit communicates with the plurality of voltage regulators by detecting a transition from the logic high on the data bus to the logic low on the data bus, determining a time period value during which the data bus remained at the logic high, and shifting the time period value by two bits: and
wherein data rate communication speed is determined by a data rate of at least one of the plurality of voltage regulators.

6. The apparatus of claim 5, wherein the integrated circuit further comprises logic to initiate a timing negotiation process with the plurality of voltage regulators, wherein the timing negotiation process is to determine a communication speed associated with one or more of the plurality of voltage regulators.

7. The apparatus of claim 6, wherein the timing negotiation process is to select a communication speed which permits communication with a voltage regulator that has the slowest data rate.

8. The apparatus of claim 5, comprising logic to initiate a data rate negotiation process with at least one of the voltage regulators.

9. The apparatus of claim 5, wherein the data bus is to facilitate serial communication between the integrated circuit and at least one of the plurality of voltage regulators.

10. An electronic device, comprising: a display;
an integrated circuit; a plurality of voltage regulators; and
a data bus coupled to the integrated circuit and the plurality of voltage regulators; wherein the integrated circuit comprises logic to embed a timing signal on the data bus; wherein the logic to embed a timing signal is to drive the data bus to a logic high for a period of time corresponding to one-fourth a clock cycle, then to a logic low for a period of time corresponding to three-fourths a clock cycle; and
wherein the integrated circuit comprises logic to initiate an address-time negotiation with the plurality of voltage regulators over the data bus to determine a data rate communication speed at which the integrated circuit communicates with the plurality of voltage regulators by detecting a transition from the logic high on the data bus to the logic low on the data bus, determining a time period value during which the data bus remained at the logic high, and shifting the time period value by two bits: and
wherein data rate communication speed is determined by a data rate of at least one of the plurality of voltage regulators.

11. The electronic device of claim 10, wherein the integrated circuit further comprises logic to initiate a timing negotiation process with the plurality of voltage regulators, wherein the timing negotiation process is to determine a communication speed associated with one or more of the plurality of voltage regulators.

12. The electronic device of claim 11, wherein the timing negotiation process is to select a communication speed which permits communication with a voltage regulator that has the slowest data rate.

13. The electronic device of claim 10, comprising logic to initiate a data rate negotiation process with at least one of the voltage regulators.

14. The electronic device of claim 10, wherein the data bus is to facilitate serial communication between the integrated circuit and at least one of the plurality of voltage regulators.

* * * * *